Feb. 5, 1935.    J. BETHUNE    1,989,663
POWER TRANSMISSION GEARING
Filed Sept. 3, 1929
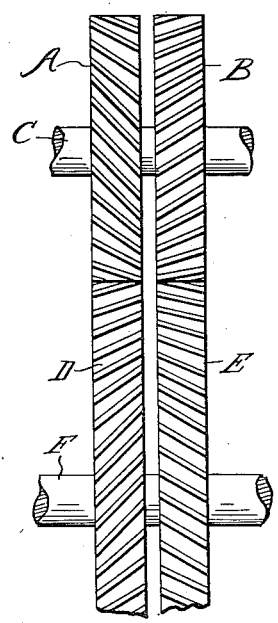
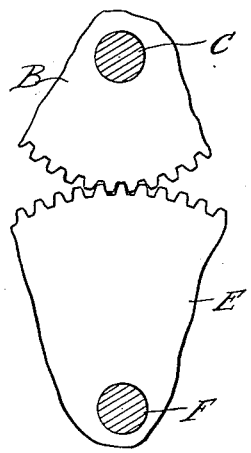
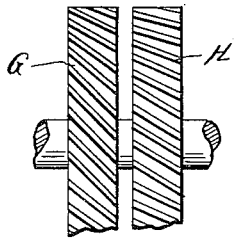
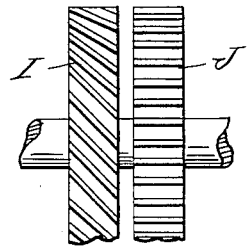
INVENTOR
John Bethune
BY Whittemore Hulbert
Whittemore & Belknap
ATTORNEYS Patented Feb. 5, 1935

1,989,663

UNITED STATES PATENT OFFICE 1,989,663

POWER TRANSMISSION GEARING

John Bethune, Rochester, N. Y., assignor to Reo Motor Car Company, Lansing, Mich., a corporation of Michigan Application September 3, 1929, Serial No. 390,031

8 Claims. (Cl. 74—466)

The invention relates to power transmission gearing and more particularly to that type in which the power is transmitted through a plurality of loaded gear trains having noise reducing differential characteristics. The present invention relates to a particular construction of this type, viz: one in which the gear trains have respectively teeth of different helical angles and the invention therefore consists in the construction as hereinafter set forth.

In the drawing:

Figure 1 is a side elevation of a power transmission gearing embodying my invention;

Figure 2 is an end elevation thereof;

Figures 3 and 4 are views similar to Figure 1 showing modified constructions.

It is well known in the gear art that where gears are running at a relatively high peripheral speed there is developed a sound or tone which rises in pitch as the speed is increased. It is also a fact that gears of different characteristics such as differences in circular pitch or in angle of teeth have individual tone producing qualities. I have discovered that where the power is transmitted through a plurality of gear trains having differential characteristics the sound produced is lessened, probably through interference between vibrations of different frequencies having a neutralizing effect on each other. Whether or not this is the true theory, it is a demonstrated fact that with such constructions noise production is lessened.

With the particular type of construction forming the subject matter of the present application, the differential characteristic is a difference in helical angles of the two trains. Thus as illustrated in Figure 1, A and B are two parallel gears of the same pitch mounted upon a common shaft C and intermeshing with companion gears D and E mounted on a shaft F. The gears A, D, B, E are helical, but the helical angle of the gears A, D differs from that of the gears B, E. Thus as shown the gears A and D have teeth with a helical angle of approximately forty-five degrees, whereas the gears B and E have teeth with a helical angle of thirty degrees. Also as shown in Figure 1 the helical angles of the gears and the two trains are oppositely inclined so as to produce opposed thrusts.

As shown in Figure 3, the gears G, H of the parallel trains have helical teeth respectively of the helical angle of forty-five degrees and thirty degrees but sloped in the same general direction. In Figure 4 the gears I and J of the two trains have the helical teeth of any desired angle and the other straight spur teeth. The several constructions have, however, the common feature of a differential helical angle in the two trains.

What I claim as my invention is:

1. The combination with a rotary drive member and a rotary driven member rotatable about parallel horizontal axes, of a gear train therebetween having a plurality of equal ratio simultaneously loaded gear train portions between said members, said gear train portions having noise-reducing differential characteristics including a differential helical angle of teeth.

2. The combination with a rotary drive member and a rotary driven member, of a gear train therebetween having a plurality of equal ratio simultaneously loaded gear train portions between said members, said gear train portions being juxtaposed and the teeth in the respective gear train portions being of different helical angle but not inclined in opposite directions.

3. The combination with a rotary drive member and a rotary driven member, of a gear train therebetween having a plurality of equal ratio simultaneously loaded gear train portions between said members, said gear train portions being juxtaposed, the teeth in the respective gear train portions being of different helical angle and inclined in the same general direction.

4. The combination with a rotary drive member and a rotary driven member rotatable about parallel horizontal axes, of a gear train therebetween having a plurality of equal ratio simultaneously loaded gear train portions between said members, said gear train portions being juxtaposed and the teeth in the respective gear train portions being oppositely inclined and of different helical angle.

5. The combination with a rotary drive member and a rotary driven member, of a gear train therebetween having a plurality of equal ratio simultaneously loaded gear train portions between said members, said gear train portions being juxtaposed, one of the gear train portions having spur teeth and the other having helical teeth.

6. The combination with a rotary drive member and a rotary driven member rotatable about parallel horizontal axes, of a gear train therebetween having a plurality of equal ratio simultaneously loaded gear train portions between said members, said gear train portions being juxtaposed, the teeth in the respective gear train portions being of different helical angle and inclined in the same general direction.

7. The combination with a rotary drive member and a rotary driven member rotatable about parallel horizontal axes, of a gear train therebetween having a plurality of equal ratio simultaneously loaded gear train portions between said members, said gear train portions being juxtaposed, one of the gear train portions having spur teeth and the other having helical teeth.

8. The combination with a rotary drive member and a rotary driven member, rotatable about parallel horizontal axes, of a gear train therebetween having a plurality of equal ratio simultaneously loaded, substantially non-shiftable gear train portions between said members, said gear train portions having noise reducing differential characteristics including a differential helical angle of teeth.

JOHN BETHUNE.